United States Patent
Bookbinder et al.

(10) Patent No.: US 9,322,991 B2
(45) Date of Patent: Apr. 26, 2016

(54) PRIMARY COATING COMPOSITIONS WITH REINFORCING POLYMER

(71) Applicant: Corning Incorporated, Corning, NY (US)

(72) Inventors: Dana Craig Bookbinder, Corning, NY (US); Kevin Robert McCarthy, Horseheads, NY (US); Weijun Niu, Painted Post, NY (US); David Neal Schissel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/603,874

(22) Filed: Jan. 23, 2015

(65) Prior Publication Data

US 2015/0219845 A1  Aug. 6, 2015

Related U.S. Application Data

(60) Provisional application No. 61/934,931, filed on Feb. 3, 2014.

(51) Int. Cl.

| | |
|---|---|
| *G02B 6/02* | (2006.01) |
| *G02B 6/036* | (2006.01) |
| *G02B 1/14* | (2015.01) |
| *G02B 1/12* | (2006.01) |
| *C03C 25/10* | (2006.01) |
| *C03C 25/28* | (2006.01) |
| *G02B 1/04* | (2006.01) |

(52) U.S. Cl.
CPC .......... *G02B 6/03694* (2013.01); *C03C 25/106* (2013.01); *C03C 25/285* (2013.01); *G02B 1/12* (2013.01); *G02B 1/14* (2015.01); *G02B 6/02395* (2013.01); *G02B 1/045* (2013.01)

(58) Field of Classification Search
CPC .......... G02B 6/02395; G02B 6/02104; G02B 6/02057; G02B 6/03694; G02B 6/14; C08F 290/067
See application file for complete search history.

(56) References Cited

U.S. PATENT DOCUMENTS

| | | | |
|---|---|---|---|
| 6,810,187 B2 | 10/2004 | Fabian et al. | |
| 2003/0095770 A1 | 5/2003 | Fewkes et al. | |
| 2008/0226916 A1* | 9/2008 | Steeman | ...... C03C 25/106 428/392 |
| 2011/0300367 A1 | 12/2011 | Chien | |
| 2013/0302003 A1 | 11/2013 | Bookbinder et al. | |
| 2014/0341524 A1 | 11/2014 | Bookbinder et al. | |

FOREIGN PATENT DOCUMENTS

| | | |
|---|---|---|
| CN | 101654571 A | 2/2010 |
| EP | 1 076 250 | 2/2001 |
| EP | 2041230 B1 | 9/2010 |
| KR | 2009069144 A | 6/2009 |
| RU | 2387634 | 4/2010 |
| WO | 2013/169840 | 11/2013 |
| WO | 2014/186322 | 11/2014 |

OTHER PUBLICATIONS

A Priola, et. al., Properties of polymetric films obtained from u.v. cured poly(ethylene glycol) diacrylates, Polymer, 34, 3653-3657, 1993—Abtract.
G. Mallucelli, et. al., Photopolymerization of poly(tetramethylene ether) glycol diacrylates and properties of the obtained networks, Polymer, 37, 2565-2571, 1996.
G Mallucelli, et. al., Synthesis of Poly(propylene-Glycol-Diacrylates) and Properties of the Photocured Networks, J. Appl. Poly. Sci., 65; 491-497, 1997.
Bouanga, et. al., Dielectric Study or Low Glass Transition Temperature Cycloaliphatic UV-curable Epoxy Networks, IEEE Transactions on Dielectrics and Electrical Insulation vol. 19, No. 4; Aug. 2012.
RU2387634—machine translation abstract.
KR2009069144—machine translation.
CN101654571—machine translation.

* cited by examiner

*Primary Examiner* — Michelle R Connelly
*Assistant Examiner* — Hoang Tran
(74) *Attorney, Agent, or Firm* — Kevin L. Bray

(57) ABSTRACT

Coating compositions that include acrylic polymers as reinforcing agents. The coating compositions are radiation-curable and include a multifunctional acrylate component, an acrylic monomer diluent, an acrylic polymer, and a photoinitiator. The acrylic polymer is not radiation-curable and lacks hydrogen-donor groups, urea groups, and urethane groups. The acrylic polymer is non-reactive and does not chemically bond to the crosslinked network formed by curing the acrylate components. Instead, the acrylic polymer reinforces the cured network through physical interactions. Representative acrylic polymers include (meth)acrylates that lack substituents with hydrogen-donor, urea, and urethane groups.

16 Claims, No Drawings

PRIMARY COATING COMPOSITIONS WITH REINFORCING POLYMER

This application claims the benefit of priority under 35 U.S.C. §119 of U.S. Provisional Application Ser. No. 61/934,931 filed on Feb. 3, 2014 the content of which is relied upon and incorporated herein by reference in its entirety.

FIELD

The present application relates to compositions used to form coatings for optical fibers. More particularly, this application relates to radiation-curable primary coating compositions and cured primary coatings. Most particularly, this application relates to primary coatings and compositions that combine a non-radiation-curable acrylic polymer additive with radiation-curable monomers and/or crosslinkers.

TECHNICAL BACKGROUND

Optical fibers typically include an outer polymer coating to protect the core/cladding glass portions. The light transmitting performance of an optical fiber is highly dependent upon the properties of the polymer coating that is applied to the fiber. Typically a dual-layer coating system is used. The dual-layer coating includes a softer (lower modulus) primary coating in contact with the glass fiber and a harder (higher modulus) secondary coating that surrounds the primary coating. The harder secondary coating allows the fiber to be handled and further processed, while the softer primary coating plays a key role in dissipating external forces and preventing them from being transferred to the fiber where they can cause microbend induced light attenuation.

The functional requirements of the primary coating place various constraints on the materials that are used for these coatings. The Young's modulus of the primary coating is generally less than 1 MPa, and is ideally less than 0.5 MPa. The glass transition temperature of the primary coating is less than 0° C., and is ideally less than −20° C. to ensure that the primary coating remains soft when the fiber is deployed in a low temperature environment. In order to ensure uniform deposition on the fiber, the primary coating is applied to the fiber in the form of an uncured liquid composition and must quickly cure to form a solid coating having sufficient mechanical integrity to support subsequent application of the liquid composition used to form the surrounding secondary coating. Also, the tensile strength of the primary coating, which generally decreases as the modulus decreases, must be high enough to prevent tearing defects during on draw processing or subsequent processing of the coated fiber during cabling, etc.

In order to meet these requirements, optical fiber coatings are usually formulated as mixtures of radiation curable urethane/acrylate oligomers and radiation curable acrylate functional diluents. Upon exposure to light in the presence of a photoinitiator, the acrylate groups rapidly polymerize to form a crosslinked polymer network, which is further strengthened by hydrogen bonding interactions between urethane groups along the oligomer backbone. By varying the urethane/acrylate oligomer, it is possible to form coatings having very low modulus values while still maintaining sufficient tensile strength. Numerous optical fiber coating formulations have been disclosed in which the composition of the radiation-curable urethane/acrylate oligomer has been varied to achieve different property targets.

Radiation-curable optical fiber coatings having low modulus values and low glass transition temperatures can be prepared using acrylate functional oligomers alone, such as polyalkylene glycol diacrylates, but such coatings typically have very poor tensile strength due to the absence of the reinforcing urethane groups found in the more commonly used coatings. The use of a non-radiation-curable thermoplastic elastomer as a toughening additive in a crosslinked radiation curable all acrylic optical fiber coating has been disclosed in U.S. Pat. No. 6,810,187. Specifically disclosed are block copolymers comprising a thermoplastic polyurethane, styrene butadiene, EPDM, ethylene propylene rubber, synthetic styrene butadiene rubber, styrenic block compolymers or combinations, where the elastomeric soft block comprises a polybutadiene, hydrogenated polybutadiene, polyisoprene, polyethylene/butylene, polyethylene/propylene, diol block or combinations thereof.

However, the nature of these thermoplastic elastomers may limit their solubility in, and consequently their ability to toughen, a typical fiber coating composition based on acrylic monomers. Solid, high molecular weight thermoplastic urethane elastomers are insoluble or sparingly soluble in most acrylic monomers. The poor solubility limits the amount of thermoplastic elastomer that can be used as a toughening additive in a coating formulation. Slightly higher solubility of thermoplastic urethane elastomers is observed in highly polar acrylic monomers, but such monomers are expensive and the solubility remains well below the levels desired for a practical coating composition. Many highly polar acrylic monomers are also known to cause excessive smoking during the coating operation when drawn on optical fiber. Other elastomer additives, such as those based on butadiene or other hydrocarbon-like soft blocks, are only soluble in highly non-polar monomers, such as lauryl acrylate, isodecyl acrylate or tridecyl acrylate, which are known to inhibit fiber coating curing speeds. Also, the increase in coating viscosity resulting from addition of larger amounts of a high molecular weight elastomer with only limited solubility in the coating monomer is often detrimental to the coating operation.

There remains a need for coating formulation additives that enable economical primary coating materials that possess low modulus and high tensile strength.

SUMMARY

This description provides coating compositions for optical fibers, coatings formed from the compositions, fibers coated with the coating formed from the compositions, and methods of forming coatings on fibers with the compositions.

The description includes a radiation-curable optical fiber coating that contains one or more acrylic polymers, where the acrylic polymer(s) lack a radiation-curable functional group, lack a hydrogen-donor group, lack a urea group, and lack a urethane group. The acrylic polymer is non-reactive with all other compounds present in the coating composition. The non-reactive, non-radiation-curable acrylic polymer may be used as a reinforcing agent in a low modulus, crosslinked acrylic coating prepared by radiation curing a composition that includes a photoinitiator, one or more monofunctional radiation-curable monomers and/or one or more multi-functional radiation-curable compounds. The multi-functional radiation-curable compound may be a multi-functional radiation-curable monomer. The multi-functional radiation-curable component may be a multi-functional radiation-curable oligomer.

In one embodiment, the coating composition includes a radiation-curable component, an acrylic polymer, and a photoinitiator. The radiation-curable component may include one or more radiation-curable compounds. The one or more radiation-curable compounds may include one or more monomers, one or more oligomers, or a combination of one or more monomers and one or more oligomers. The monomers may function as reactive diluents in the coating composition. The radiation-curable component includes a radiation-curable functional group. The radiation-curable group may be an ethylenically unsaturated group, such as an acrylate or methacrylate group. The radiation-curable component may be monofunctional or multifunctional.

In one embodiment, the acrylic polymer is a homopolymer of an acrylic monomer that lacks hydrogen-donor groups, urea groups, and urethane groups. In another embodiment, the acrylic polymer is a copolymer formed from two or more acrylic monomers, none of which includes a hydrogen-donor group, a urea group, or a urethane group. The acrylic polymer lacks hydrogen-donor groups, urethane groups, urea groups, and radiation-curable groups. The acrylic polymer may also lack isocyanate groups. Representative acrylic monomers include acrylates and methacrylates that lack substituents having hydrogen-donor groups, urea groups, or urethane groups. The acrylate and methacrylate monomers may also lack isocyanate groups.

The coating composition may optionally include one or more non-radiation-curable constituents in addition to a non-radiation-curable acrylic polymer that lacks hydrogen-donor groups, urea groups, and urethane groups. The one or more optional non-radiation-curable constituents may include linear or branched urethane oligomers, or additional acrylic polymers or copolymers that may include hydrogen-donor groups, or radiation-curable monomers that include hydrogen-donor groups.

The present description extends to:
An optical fiber coating composition comprising:
a radiation-curable component;
a photoinitiator; and
an acrylic polymer, said acrylic polymer lacking radiation-curable groups, hydrogen-donor groups, urethane groups, and urea groups.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

DETAILED DESCRIPTION

The present description provides a coating composition and coating for optical fibers. The coating composition is radiation-curable and, upon curing, forms a fiber coating that has low modulus and high tensile strength. The cured coating has characteristics that are suitable for use as a primary coating for optical fibers. The present application extends to a fiber coated with a coating formed from the coating composition disclosed herein as well as to a method of coating a fiber with the coating composition.

In one embodiment, the coating composition includes a radiation-curable component, an acrylic polymer, and a photoinitiator. The radiation-curable component may include one or more radiation-curable compounds. The radiation-curable compounds may include one or more radiation-curable monomers, one or more radiation-curable oligomers, or a combination of one or more radiation-curable monomers and one or more radiation-curable oligomers. The radiation-curable monomer(s) may function as reactive diluent(s) in the coating composition and may afford control over the viscosity of the coating composition to facilitate processing. Each radiation-curable compound includes a radiation-curable functional group. The radiation-curable group may be an ethylenically unsaturated group, such as an acrylate or methacrylate group. The radiation-curable compounds may be monofunctional or multifunctional. Multifunctional radiation-curable compounds may function as crosslinking agents and may be referred to herein as "crosslinkers". Each of the monofunctional or multifunctional radiation-curable compounds may, independently, have a number average molecular weight of less than 3000 g/mol, or less than 2500 g/mol, or less than 2000 g/mol, or less than 1500 g/mol, or less than 1000 g/mol.

The radiation-curable component may include a radiation-curable monofunctional or multifunctional monomer. The monomer may include a monofunctional or multifunctional (meth)acrylate monomer. As used herein, the term "(meth) acrylate" means acrylate or methacrylate. The monomer may include polyether (meth)acrylates, polyester (meth)acrylates, or polyol (meth)acrylates. The multifunctional monomer may be a di(meth)acrylate, tri(meth)acrylate, tetra(meth) acrylate, or higher (meth)acrylate. Monofunctional or multifunctional polyol (meth)acrylates may include monofunctional or multifunctional polyalkoxy(meth)acrylates (e.g. polyethyleneglycol diacrylate, polypropylene glycol diacrylate). The monofunctional or multifunctional monomer may lack urethane groups, urea groups, isocyanate groups, and hydrogen-donor groups. Lack of hydrogen-donor groups precludes the monofunctional or multifunctional monomer from functioning as a hydrogen donor in hydrogen bonding interactions.

Radiation-curable monomers may also include ethylenically-unsaturated compounds, ethoxylated (meth)acrylates, ethoxylated alkylphenol mono(meth)acrylates, propylene oxide (meth)acrylates, n-propylene oxide (meth)acrylates, isopropylene oxide (meth)acrylates, monofunctional (meth) acrylates, monofunctional aliphatic epoxy (meth)acrylates, multifunctional (meth)acrylates, multifunctional aliphatic epoxy (meth)acrylates, and combinations thereof. The monomer component may include compounds having the general formula $R_2-R_1-O-(CH_2CH(CH_3)-O)_n-COCH=CH_2$, where $R_1$ and $R_2$ are aliphatic, aromatic, or a mixture of both, and n=1 to 10, or $R_1-O-(CH_2CH(CH_3)-O)_n-COCH=CH_2$, where $R_1$ is aliphatic or aromatic, and n=1 to 10, or formula $R_2-R_1-O-(CH_2CH_2-C)_n-COCH=CH_2$, where $R_1$ and $R_2$ are aliphatic, aromatic, or a mixture of both, and n=1 to 10, or $R_1-O-(CH_2CH_2-O)_n-COCH=CH_2$, where $R_1$ is aliphatic or aromatic, and n=1 to 10.

Representative radiation-curable monomers include ethylenically unsaturated monomers such as ethylhexyl acrylate, lauryl acrylate (e.g., SR335, Sartomer USA (Exton, Pa.), AGEFLEX FA12, BASF, and PHOTOMER 4812, IGM Resins (St. Charles, Ill.), ethyoxylated lauryl acrylate (e.g. CD9075, Sartomer USA (Exton, Pa.), ethoxylated nonylphenol acrylate (e.g., SR504, Sartomer USA (Exton, Pa.) and PHOTOMER 4066 available from IGM Resins (St. Charles, Ill.)), caprolactone acrylate (e.g., SR495, Sartomer USA (Exton, Pa.), and TONE M-100 available from Dow Chemical), phenoxyethyl acrylate (e.g., SR339, Sartomer USA (Exton, Pa.), AGEFLEX PEA available from BASF, and PHOTOMER 4035 available from IGM Resins (St. Charles, Ill.)), isooctyl acrylate (e.g., SR440, Sartomer USA (Exton, Pa.) and AGEFLEX FAB, BASF), tridecyl acrylate (e.g., SR489, Sartomer USA (Exton, Pa.)), isobornyl acrylate (e.g., SR506, Sartomer USA (Exton, Pa.) and AGEFLEX IBOA, CPS Chemical Co.), tetrahydrofurfuryl acrylate (e.g., SR285, Sartomer USA (Exton, Pa.)), stearyl acrylate (e.g., SR257, Sartomer USA (Exton, Pa.)), isodecyl acrylate (e.g., SR395, Sartomer USA (Exton, Pa.) and AGEFLEX FA10, BASF), 2-(2-ethoxyethoxyl)ethyl acrylate (e.g., SR256, Sartomer USA (Exton, Pa.)), epoxy acrylate (e.g., CN120, Sartomer USA (Exton, Pa.), and EBECRYL 3201 and 3604, Cytec Industries Inc. (Woodland Park, N.J.)), lauryloxyglycidyl acrylate (e.g., CN130, Sartomer USA (Exton, Pa.)) and phenoxyglycidyl acrylate (e.g., CN131, Sartomer USA (Exton, Pa.)) and combinations thereof.

The radiation-curable component of the coating composition may include a multifunctional (meth)acrylate monomer. Multifunctional (meth)acrylates are (meth)acrylates having two or more polymerizable (meth)acrylate moieties per molecule. The multifunctional (meth)acrylate may have three or more polymerizable (meth)acrylate moieties per molecule. The multifunctional (meth)acrylate may have four or more polymerizable (meth)acrylate moieties per molecule.

Examples of multifunctional (meth)acrylates include dipentaerythritol monohydroxy pentaacrylate (e.g. PHOTOMER 4399, IGM Resins (St. Charles, Ill.)); methylolpropane polyacrylates with and without alkoxylation such as trimethylolpropane triacrylate (e.g. SR 351, Sartomer USA (Exton, Pa.), ditrimethylolpropane tetraacrylate (e.g., PHOTOMER 4355, IGM Resins (St. Charles, Ill.)); alkoxylated glyceryl triacrylates such as propoxylated glyceryl triacrylate with propoxylation being 3 or greater (e.g., PHOTOMER 4096, IGM Resins (St. Charles, Ill.)); triproplyleneglycol diacrylate (e.g. SR306, Sartomer USA (Exton, Pa.)); dipropylene glycol diacrylate (e.g. SR508, Sartomer USA (Exton, Pa.)); and erythritol polyacrylates with and without alkoxylation, such as pentaerythritol tetraacrylate (e.g., SR295, Sartomer USA (Exton, Pa.)), ethoxylated pentaerythritol tetraacrylate (e.g., SR494, Sartomer USA (Exton, Pa.)), and dipentaerythritol pentaacrylate (e.g., PHOTOMER 4399, IGM Resins (St. Charles, Ill.), and SR399, Sartomer USA (Exton, Pa.)).

Unless otherwise specified or implied herein, the weight percent (wt %) of a particular constituent in the coating composition refers to the amount of the constituent present in the curable composition on an additive-free basis. Generally, the weight percents of the radiation-curable component, acrylic polymer(s) and initiator(s) sum to 100%. When present, the amount of an additive is reported herein in units of parts per hundred (pph) relative to the combined amounts of radiation-curable compounds(s), acrylic polymer(s), and initiator(s). An additive present at the 1 pph level, for example, is present in an amount of 1 g for every 100 g of combined radiation-curable component, acrylic polymer(s), and initiator(s). The weight percent of a constituent of the present coating compositions may also be referred herein as the concentration of the constituent.

A monofunctional radiation-curable monomer may be present in the radiation-curable coating composition at a concentration from 10-60 wt %, or from 10-30 wt %, or from 30-60 wt %, or from 40-80 wt %, or from 60-80 wt %. The radiation-curable coating composition may include one or more monofunctional (meth)acrylate monomers in an amount from 5-95 wt %, or from 0-75 wt %, or from 40-65 wt %. The radiation-curable coating composition may include one or more monofunctional aliphatic epoxy (meth)acrylate monomers in an amount from 5-40 wt %, or from 10-30 wt %.

A multifunctional radiation-curable monomer may be present in the radiation-curable coating composition at a concentration from 0.05-15 wt %, or from 0.1-10 wt %, or from 0.5-10 wt %, or from 1-5 wt %, or from 1-10 wt %, or from 1-20 wt %, or from 1-50 wt %, or from 2-8 wt %, or from 5-40 wt %, or from 10-30 wt %, or from 20-30 wt %.

The radiation-curable component of the coating composition may include an N-vinyl amide such as an N-vinyl lactam, or N-vinyl pyrrolidinone, or N-vinyl caprolactam. The N-vinyl amide monomer may be present in the radiation-curable composition at a concentration from 0.1-40 wt %, or from 2-10 wt %.

The radiation-curable component of the coating composition may include a radiation-curable hydroxyfunctional monomer. A hydroxyfunctional monomer is a monomer that has a pendant hydroxy moiety in addition to radiation-curable functionality such as (meth)acrylate. Examples of hydroxy-functional monomers including pendant hydroxyl groups include caprolactone acrylate (available from Dow Chemical as TONE M-100); poly(alkylene glycol)mono(meth)acrylates, such as poly(ethylene glycol)monoacrylate, polypropylene glycol)monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich (Milwaukee, Wis.).

The hydroxyfunctional monomer may be present in the radiation-curable coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the radiation-curable coating composition may be between about 5 wt % and about 95 wt %, or between about 30 wt % and about 75 wt %, or between about 40 wt % and about 65 wt %.

The radiation-curable component may include a radiation-curable monofunctional or multifunctional oligomer. The oligomer may be a (meth)acrylate-terminated oligomer. The oligomer may include polyether acrylates (e.g., GENOMER 3456, available from Rahn USA (Aurora, Ill.)), polyester acrylates (e.g., EBECRYL 80, 584 and 657, available from Cytec Industries Inc. (Woodland Park, N.J.)), or polyol acrylates. The oligomer may be a di(meth)acrylate, tri(meth)acrylate, tetra(meth)acrylate, or higher (meth)acrylate. Polyol (meth)acrylates may include polyalkoxy(meth)acrylates or polyol(meth)acrylates. Examples include polyethylene glycol diacrylate and polypropylene glycol diacrylate. The monofunctional or multifunctional oligomer may lack urethane groups, urea groups, isocyanate groups, and/or hydrogen-donor groups. Lack of hydrogen-donor groups precludes the monofunctional or multifunctional oligomer from functioning as a hydrogen donor in hydrogen bonding interactions.

The oligomer of the curable primary coating composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the radiation-curable coating composition may be between about 5 wt % and about 95 wt %, or between about 25 wt % and about 65 wt %, or between about 35 wt % and about 55 wt %.

The acrylic polymer is a polymer formed from one or more acrylic monomers. Alternatively, the acrylic polymer is a polymer having repeat units derived from one or more acrylic monomers. As used herein, an acrylic monomer is a compound of the form given in formula (I):

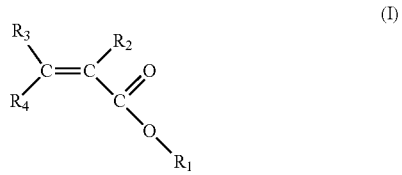

where $R_1$, $R_2$, $R_3$, and $R_4$ may be different or one or more of $R_1$, $R_2$, $R_3$, and $R_4$ may be the same. $R_1$, $R_2$, $R_3$, and $R_4$ may independently be H, an alkyl group, a linear alkyl group, a branched alkyl group, an oxygenated alkyl group (e.g. an alkyl chain including an ether linkage, an ester linkage, or a carbonyl moiety), an alkoxy group, or a tertiary amine group with the proviso that none of $R_1$, $R_2$, $R_3$, and $R_4$ includes a hydrogen-donor group, a urea group, or a urethane group. In one embodiment, $R_1$ is an alkyl group (branched, linear, or oxygenated) and $R_2$, $R_3$, and $R_4$ are H. In another embodiment, $R_1$ is an alkyl group (branched, linear, or oxygenated), $R_2$ is a methyl group, and $R_3$ and $R_4$ are H. In one embodiment, none of $R_1$, $R_2$, $R_3$, and $R_4$ includes an isocyanate group.

In one embodiment, the acrylic polymer is a homopolymer of an acrylic monomer lacking hydrogen-donor groups, urea groups, and urethane groups. In another embodiment, the acrylic polymer is a copolymer of two or more distinct acrylic monomers, each of which lacks hydrogen-donor groups, urea groups, and urethane groups. The copolymer may be a block copolymer or a random copolymer. The acrylic polymer formed from one or more acrylic monomers lacks hydrogen-donor groups, lacks urethane groups, lacks urea groups, and lacks radiation-curable groups. The acrylic polymer is non-reactive with other components of the coating composition. In one embodiment, the acrylic polymer further lacks isocyanate groups.

Acrylic monomers lacking hydrogen-donor groups may have hydrogen-acceptor groups or polar groups. Hydrogen-acceptor groups may include carbonyl groups, ether groups, ester groups, or nitrogen groups. The hydrogen-acceptor or polar groups may be present along the backbone of the polymer or in pendent groups of the polymer formed from one or more acrylic monomers.

Acrylic monomers that may be used to form the acrylic polymer include alkylacrylates and alkylmethacrylates. Representative monomers lacking hydrogen-donor groups include:

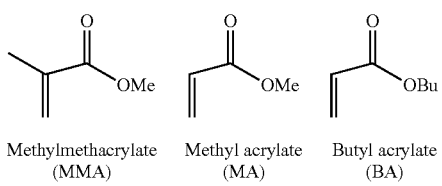

Methylmethacrylate (MMA)  Methyl acrylate (MA)  Butyl acrylate (BA)

as well as ethyl(meth)acrylate, n-propyl(meth)acrylate, n-butyl(meth)acrylate, isobutyl(meth)acrylate, isopropyl(meth)acrylate, hexyl(meth)acrylate, dodecyl(meth)acrylate, 2-ethylhexyl(meth)acrylate, isobornyl(meth)acrylate. Other examples of acrylic monomers lacking hydrogen-donor groups, urea groups, and urethane groups include pentyl (meth)acrylate, heptyl (meth)acrylate, octyl(meth)acrylate, nonyl (meth)acrylate, decyl (meth)acrylate, undecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, icosyl (meth)acrylate, and their corresponding structural isomers or halogated derivatives, ethylene (or propylene) glycol methyl ether (meth)acrylates, poly(ethylene (or propylene) glycol)methyl ether (meth)acrylates, benzyl (meth)acrylate, and their derivatives, acrylonitrile, N-vinylpyrrolidone and N-vinylcaprolactam. The nitrogens in N-vinylpyrrolidone and N-vinylcaprolactam may function as hydrogen-acceptor groups.

Acrylic polymers may be prepared by techniques such as free-radical polymerization, RAFT (reversible addition-fragmentation chain transfer polymerization), ATRP (atom transfer radical polymerization), living polymerization, or anionic polymerization from two or more acrylic monomers. The polymerization reaction may include an initiator and may be carried out in bulk mixtures of one or more acrylic monomers or with one or more acrylic monomers in the presence of a solvent. The polymerization reaction may also be carried out in emulsion or suspension processes in aqueous media.

When incorporated in a radiation-curable primary coating composition, it is preferable for the acrylic polymer to have a low glass transition temperature ($T_g$). In one embodiment, the glass transition temperature of the acrylic polymer is less than 0° C. In another embodiment, the glass transition temperature of the acrylic polymer is less than −10° C. In still another embodiment, the glass transition temperature of the acrylic polymer is less than −20° C. In yet another embodiment, the glass transition temperature of the acrylic polymer is less than −30° C. In a further embodiment, the glass transition temperature of the acrylic polymer is less than −40° C.

The molecular weight of the acrylic polymer may be selected to maintain an acceptable viscosity of the coating composition and/or to impart a particular strength enhancement to the cured network. If the molecular weight of the acrylic polymer is too high, the viscosity of the coating composition is high and the coating composition may be difficult to process. To maintain an acceptable viscosity, the number average molecular weight ($M_n$) of the acrylic polymer may be less than or equal to 100,000 and the weight average molecular weight ($M_w$) of the acrylic polymer may be less than or equal to 200,000. The number average molecular weight of the acrylic polymer may be between 5,000 g/mol and 100,000 g/mol, or between 10,000 g/mol and 80,000 g/mol, or between 20,000 g/mol and 70,000 g/mol, or between 25,000 g/mol and 60,000 g/mol. The ratio of weight average molecular weight to number average molecular weight is referred to herein as the polydispersity index. The polydispersity index of the acrylic polymer may be between 1.0 and 10, or between 2.0 and 8.5, or between 2.5 and 8.0, or between 3.0 and 7.5, or between 3.5 and 7.0.

The acrylic polymer may function as a strength additive and may provide an increase in the tensile strength of coatings formed from the present radiation-curable coating composition. Since the acrylic polymer lacks radiation-curable groups and when the acrylic polymer is otherwise non-reactive with any of the constituents of the coating composition, the acrylic polymer is not chemically incorporated into the network formed from the composition upon curing. Since the acrylic polymer lacks hydrogen-donor groups, it lacks the strength-enhancing hydrogen bonding interactions of the type observed in conventional urethane/urea-based coating systems.

In the present coating composition, the acrylic polymer is expected to interact with the cured network through physical mechanisms. Without wishing to be bound by theory, it is believed that the acrylic polymer may become entangled with or may form physical crosslinks within the cured network. It is further believed that such physical interactions impart mechanical strength to the network. In one embodiment, none of the constituents of the coating composition include hydrogen-donor groups, none of the constituents of the coating composition react with the acrylic polymer, and the mechanism of interaction of the acrylic polymer with the cured network is essentially purely physical.

It is believed that an acrylic polymer may become dispersed in the polymer network formed when the radiation-curable components of the coating composition react with one another during curing. Dispersal of the acrylic polymer may provide physical entanglements or other physical interactions that act to increase the strength of the coating. The chemical compatibility of the acrylic polymers with common radiation-curable monofunctional and multifunctional (meth)acrylate monomers, oligomers, and crosslinkers leads to high solubility of the present acrylic polymers in most acrylate-based radiation-curable coating compositions. The high solubility permits incorporation of high concentrations of the acrylic polymer in the coating formulation and affords a wider range of control over the properties of cured coatings formed from the coating formulations. Unlike the thermoplastic urethane elastomers of the prior art, the present acrylic polymers are soluble in a wide range of radiation-curable acrylate coating compositions. Coating compositions need not be limited to highly polar or non-polar radiation-curable (meth)acrylate components and may include (meth)acrylate components of intermediate or moderate polarity. The present acrylic polymers are readily soluble, for example, in the radiation-curable monomer diluent ethoxylated(4)nonylphenol acrylate, which is known to facilitate fast curing of coating compositions.

The acrylic polymer may be present in the coating composition in an amount from 5-70 wt %, or from 5-50 wt %, or from 5-40 wt %, or from 5-30 wt %, or from 10-50 wt %, or from 10-40 wt %, or from 10-30 wt %, or from 10-25 wt %, or from 15-30 wt %.

Suitable photoinitiators for the radiation-curable coating composition include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF); ethoxy(2,4,6-trimethylbenzoyl)-phenylphosphine oxide (LUCIRIN TPO-L from BASF); and combinations thereof. The photoinitiator may be present in an amount from 0.5 wt % to 5.0 wt %, or from 1.0 wt % to 3.0 wt %.

In one embodiment, the coating composition includes 5-70 wt % of one or more acrylic polymers, 10-60 wt % of one or more monofunctional (meth)acrylate monomers, 5-40 wt % of one or more multifunctional (meth)acrylate monomers, and 0.5-5.0 wt % of photoinitiator.

In a second embodiment, the radiation-curable coating composition may include 10-50 wt. % of one or more acrylic polymers, 30-60 wt. % of one or more monofunctional (meth)acrylate monomers, 10-30 wt. % of one or more multifunctional (meth)acrylate monomers (or oligomers), and 0.5-5 wt. % of photoinitiator.

In a third embodiment, the radiation-curable coating composition may include 10-30 wt. % of one or more acrylic polymers, 30-60 wt. % of one or more monofunctional (meth)acrylate monomers, 20-30 wt. % of one or more multifunctional (meth)acrylate monomers (or oligomers), and 0.5-5 wt. % of photoinitiator.

In a fourth embodiment, the radiation-curable coating composition may include 10-40 wt. % of one or more acrylic polymers, 40-80 wt. % of one or more monofunctional (meth)acrylate monomers, 1-20 wt. % of one or more multifunctional (meth)acrylate monomers (or oligomers), and 0.5-5 wt. % of photoinitiator.

In a fifth embodiment, the radiation-curable coating composition may include 15-30 wt. % of one or more acrylic polymers, 60-80 wt. % of one or more monofunctional (meth) acrylate monomers, 1-10 wt. % of one or more multifunctional (meth)acrylate monomers (or oligomers), and 0.5-5 wt. % of photoinitiator.

In one embodiment, the coating composition lacks urethane groups, urea groups, and hydrogen-donor groups. In another embodiment, the coating composition lacks isocyanate groups, urethane groups, urea groups, and hydrogen-donor groups. In one embodiment, the cured coating formed from the present coating composition lacks hydrogen-donor groups, urea groups, and urethane groups. In another embodiment, the cured coating formed from the present coating composition lacks hydrogen-donor groups, urea groups, urethane groups. and isocyanate groups.

The coating composition may optionally include one or more non-radiation-curable constituents in addition to a non-radiation-curable acrylic polymer. The one or more optional non-radiation-curable constituents may include linear or branched urethane oligomers of the type shown in formula (IIa) or (IIb) below:

(IIa)

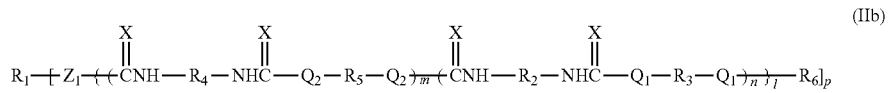

(IIb)

in which, $R_1$ is a core moiety of a multifunctional reactant, where the number of functional groups of the core moiety is defined by p, where p is 2 or greater;

each X is independently S or O;

$Z_1$ is —O—, —S—, —N(H)—, or —N(alkyl)-;

each of $Q_1$ and $Q_2$ is independently —O—, —S—, —N(H)—, or —N(alkyl)-;

each of $R_2$ and $R_4$ is a core moiety of a di(thio)isocyanate reactant;

$R_3$ is a core moiety of a polyol or amine-capped polyol reactant;

$R_5$ is a hydrocarbon or oxygen-containing hydrocarbon having an average molecular weight of between about 28 to about 400;

$R_6$ is represented by the structure according to formula (III) or (IV)

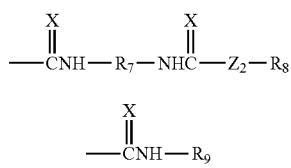

(III)

(IV)

where X is defined as above, $Z_2$ is —O—, —S—, —N(H)—, or —N(alkyl)-, $R_7$ is a core moiety of a di(thio) isocyanate reactant, $R_8$ is a non-radiation curable capping agent, and $R_9$ is a core moiety of an isocyanate or thioisocyanate reactant;

l is 1 to 6;

m is greater than or equal to 0, preferably 1 to 4, more preferably 1 to 3; and n is greater than or equal to 1, preferably 2 to 10, more preferably 2 to 6.

The core moiety ($R_1$) present in the non-radiation curable component is the reaction product of a multifunctional core reactant. The functional groups can be hydroxyl groups or amino groups. Preferably, the multifunctional core reactant is a polyol or an amine-capped polyol. Examples of these core reactants and their number of functional groups (p) include, without limitation, glycerol, where p=3; trimethylol propane, where p=3; pentaerythritol, where p=4; ditrimethylol propane, where p=4; ethylenediamine tetrol, where p=4; xylitol, where p=5; dipentaerythritol, where p=6; sucrose and other disaccharides, where p=8; alkoxylated derivatives thereof; dendrimers where p is from about 8 to about 32, such as poly(amidoamine) (PAMAM) dendrimers with G1 (p=8), G2 (p=16), or G3 (p=32) amine groups or PAMAM-OH dendrimers with G1 (p=8), G2 (p=16), or G3 (p=32) hydroxyl groups; and combinations thereof.

$R_2$, $R_4$, and $R_7$ independently represent the core moiety of a di(thio)isocyanate reactant. This includes both diisocyanates and dithioisocyanates, although diisocyanates are preferred. Although any diisocyanates and dithioisocyanates can be used, preferred $R_2$, $R_4$, and $R_7$ core groups of these diisocyanates and dithioisocyanates include the following:

| Reactant Name | $R_2$ or $R_4$ or $R_7$ Core Moiety |
|---|---|
| 4,4'-methylene bis(cyclohexyl) diisocyanate (HMDI) | 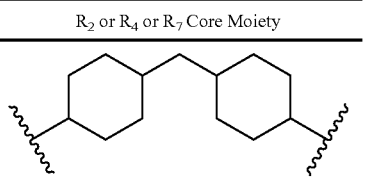 |
| toluene diisocyanate (TDI) | |
| Isophorone diisocyanate (IPDI) | |
| Tetramethyl-1,3-xylylene diisocyanate (XDI) | |
| 4,4'-methylene bis(phenyl) diisocyanate (MDI) | |
| p-phenylene diisocyanate (PDI) | |
| Alkyl diisocyanates | —$(CH_2)_q$— where q is 2 to 12, preferably 6 |

$R_3$ is a core moiety of a polyol or amine-capped polyol reactant that preferably has a number average molecular weight of greater than or equal to about 400. In certain embodiments, the polyol or amine-capped polyol has a number average molecular weight between about 1000 and about 9000, between about 2000 and 9000, or between about 4000 and 9000. Examples of suitable $R_3$-forming polyols include, without limitation, polyether polyols such as poly(propylene glycol)[PPG], poly(ethylene glycol)[PEG], poly(tetramethylene glycol) [PTMG] and poly(1,2-butylene glycol); polycarbonate polyols; polyester polyols; hydrocarbon polyols such as hydrogenated poly(butadiene)polyols; amine-capped derivatives of these polyols, and any combinations thereof.

$R_5$ is a hydrocarbon or oxygen-containing hydrocarbon, which is preferably saturated, and has an average molecular weight of between about 28 to about 400. Thus, $R_5$ is the core moiety of a low molecular weight diol (to form urethane linkages) or diamine (to form urea linkages) reactant that acts analogously to a chain extender in a polyurethane. Exemplary reactants include, without limitation, 1,4-butanediol, 1,6-butanediol, ethylene diamine, 1,4-butanediamine, and 1,6-hexanediamine. As noted above, these chain extender based urethane or urea groups are expected to result in "hard block" areas along the block moiety branch(es) that promote more effective hydrogen bonding branch interactions than would the simple urethane (or urea) linkages resulting from polyol (or amine capped polyol)/isocyanate links. Where m is 0, the hard block is not present.

R₈ is the reaction product of a non-radiation curable capping agent, which caps the reactive isocyanate group at the end of a block moiety branch. These agents are preferably monofunctional alcohols (or amines) that will react with residual isocyanate groups at the end of a branch. Examples of these reactants include, without limitation, 1-butanol, 1-octanol, poly(propylene glycol)monobutyl ether, and 2-butoxyethanol.

R₉ is a core moiety of an (thio)isocyanate reactant. Any suitable mono-functional (thio)isocyanate can be used for this purpose. Exemplary (thio)isocyanate reactants that can serve as non-reactive capping agent for an arm of the component include, without limitation, methyl isocyanate, ethyl isocyanate, n-propyl isocyanate, i-propyl isocyanate, n-butyl isocyanate, i-butyl isocyanate, n-pentyl isocyanate, n-hexyl isocyanate, n-undecylisocyanate, chloromethyl isocyanate, β-chloroethyl isocyanate, γ-chloropropyl isocyanate, ethoxycarbonylmethyl isocyanate, β-ethoxyethyl isocyanate, α-ethoxyethyl isocyanate, α-butoxyethyl isocyanate, α-phenoxyethylisocyanate, cyclopentyl isocyanate, cyclohexyl isocyanate, methyl isothiocyanate, and ethyl isothiocyanate.

The one or more optional non-radiation-curable components of the present composition may include non-radiation-curable acrylic polymers having hydrogen-donor groups. In this embodiment, the coating composition includes one or more acrylic polymers having hydrogen-donor groups in combination with one or more acrylic polymers lacking hydrogen-donor groups. The hydrogen-donor groups may further contribute to the strength of the cured composition through hydrogen bonding interactions with the cured network or with the acrylic polymer lacking hydrogen-donor groups. Acrylic polymers with hydrogen-donor groups incorporate one or more acrylic monomers having a hydrogen-donor group. The monomers may include acrylamides. The monomers may include (meth)acrylate monomers that include a substituent with a hydrogen-donor group. Hydrogen bond donor groups may include N—H, O—H or —CO₂H groups. The hydrogen-donor groups may be present along the backbone of the polymer formed from the monomers or in pendent groups of the polymer formed from the monomers.

The optional acrylic polymers with hydrogen-donor groups may also be copolymers formed from two or more acrylic monomers, where at least one of the acrylic monomers includes a hydrogen-donor group and at least one of the acrylic monomers lacks a hydrogen-donor group. Monomers lacking a hydrogen-donor group include (meth)acrylate monomers lacking substituents with hydrogen-donor groups. In one embodiment, the optional acrylic polymer with hydrogen-donor group is a copolymer formed from an acrylic monomer with a hydrogen-donor group and an acrylic monomer without a hydrogen-donor group. The copolymer may be a random copolymer, block copolymer, or other copolymer.

Acrylic monomers with hydrogen-donor groups include (meth)acrylamides, N-vinyl (meth)acrylamides, N-vinyl amide, (meth)acrylic acid, or α,β-unsaturated lactones and amides. Representative examples include:

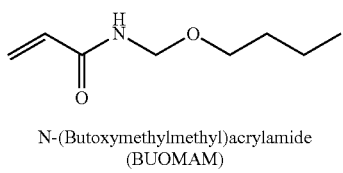

N-(Butoxymethylmethyl)acrylamide (BUOMAM)

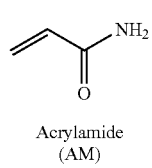

Acrylamide (AM)

-continued

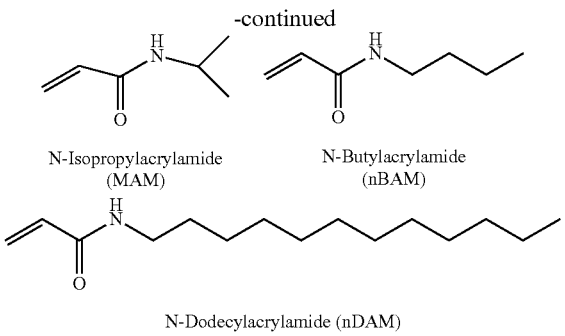

Other monomers with hydrogen-donor groups that may be included in the optional polymer (or copolymer) with hydrogen-donor groups stronger interactions include: N,N-dialkyl (meth)acrylamide; α,β-unsaturated monomers with a hydrogen bond donor group including (1) α,β-unsaturated amides: acrylamide (or methacrylamide): for example, N-methyl acrylamide (or methacrylamide), N-ethyl acrylamide (or methacrylamide), N-propyl acrylamide (or methacrylamide), N-butyl acrylamide (or methacrylamide), N-pentyl acrylamide (or methacrylamide), N-hexyl acrylamide (or methacrylamide), N-heptanyl acrylamide (or methacrylamide), N-octyl acrylamide (or methacrylamide), N-nonyl acrylamide (or methacrylamide), N-decyl acrylamide (or methacrylamide), N-undecyl acrylamide (or methacrylamide), N-dodecyl acrylamide (or methacrylamide), N-tridecyl acrylamide (or methacrylamide), N-tetradecyl acrylamide (or methacrylamide), N-pentadecyl acrylamide (or methacrylamide), N-hexadecyl acrylamide (or methacrylamide), N-heptadecyl acrylamide (or methacrylamide), N-octadecyl acrylamide (or methacrylamide), N-nonadecyl acrylamide (or methacrylamide), N-icosyl acrylamide (or methacrylamide), and their corresponding structural isomers, N-(Butoxymethyl)acrylamide, N-(hydroxymethyl)acrylamide; 2) acrylic acid and carboxylate-functionalized α,β-unsaturated esters: for example, 2-carboxyethyl acrylate; and (3) hydroxyl-functionalized α,β-unsaturated esters: for example, hydroxypropyl acrylate, 4-hydroxybutyl acrylate.

In further embodiments, the coating composition may include an acrylic polymer lacking hydrogen-donor groups, urea groups, and urethane groups in combination with a monomer that includes hydrogen-donor groups, where the monomer with hydrogen-donor groups lacks urea and urethane groups. Optional monomers with hydrogen-donor groups that lack urea and urethane groups include those mentioned hereinabove. Optional monomers with hydrogen-donor groups may be radiation-curable and may become incorporated in the cured network.

In addition to the radiation-curable component(s) (which may include one or more monofunctional or multifunctional monomer(s), oligomer(s), and crosslinkers as described hereinabove), acrylic copolymer(s), and polymerization initiator(s), the curable coating composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the cured coating formed from the radiation-curable composition. Other additives may affect the integrity of the cured coating formed from the radiation-curable coating composition (e.g., protect against de-polymerization or oxidative degradation).

Another aspect of the present disclosure relates to a method of making an optical fiber, where the method includes forming a coating on the glass (core+cladding) portion of the fiber using a radiation-curable composition that includes an acrylic copolymer in accordance with the present description.

The core and cladding of the coated fibers may be produced in a single-step operation or multi-step operation by methods that are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The radiation-curable composition of the present disclosure may be applied to the glass portion of the coated fiber after it has been drawn from the preform. The radiation-curable composition may be applied immediately after cooling. The radiation-curable composition may then be cured to form a solidified coating to produce a coated optical fiber. The method of curing may be thermal, chemical, or radiation-induced, such as by exposing the radiation-curable composition to an appropriate energetic source, such as ultraviolet light, actinic radiation, microwave radiation, or an electron beam, after the composition has been applied to the glass portion of the fiber. The appropriate form of initiation energy may depend on the coating compositions and/or polymerization initiator employed. Methods of applying layers of radiation-curable compositions to a moving glass fiber are disclosed in U.S. Pat. Nos. 4,474,830 and 4,585,165, the disclosures of which are hereby incorporated by reference herein.

EXAMPLES

A series of coating compositions consistent with the present description were prepared. The exemplary compositions incorporated poly(n-butyl acrylate) as the acrylic polymer. Poly(n-butyl acrylate) lacks radiation-curable functional groups, lacks hydrogen bonding groups, lacks urea groups, lacks urethane groups, and lacks isocyanate groups. The poly (n-butyl acrylate) used in the exemplary compositions was obtained in solid form from BASF (ACRONAL 4 F) or in toluene solvent from Scientific Polymer (the toluene solvent was removed prior to use). GPC measurements indicated that the poly(n-butyl acrylate) used in the exemplary coating compositions had a weight average molecular weight ($M_w$) of ~100,000 g/mol and a number average molecular weight ($M_n$) of ~15,000. In addition to poly(n-butyl acrylate), the compositions included one or more radiation-curable monofunctional acrylates, a radiation-curable multifunctional acrylate, and a photoinitiator. Some compositions included one or more additional additives or components.

The constituents of representative exemplary coating compositions are listed in the tables below. Each composition is identified by a separate reference numeral. In the tables, poly (n-butyl acrylate) is abbreviated as PnBa and the weight percent of each constituent is given by the number in parenthesis. The coating compositions of Table 1 include a higher molecular weight multifunctional acrylate and included no constituents with hydrogen-donor groups. The coating compositions of Table 2 include a higher molecular weight multifunctional acrylate and a monomer with hydrogen-donor groups. The coating compositions of Table 3 include a lower molecular weight multifunctional acrylate and included no constituents with hydrogen-donor groups. The coating compositions of Table 4 include a lower molecular weight multifunctional acrylate and a monomer with hydrogen-donor groups.

TABLE 1

Illustrative Coating Compositions

| Ref. No. | Acrylic Polymer | Monofunctional Acrylate(s) | Multifunctional Acrylate | Photoinitiator |
|---|---|---|---|---|
| 1 | PnBa (20) | SR504 (45) IBOA (10) | PPGDA2000 (25) | TPO (3) |
| 2 | NRBU** (20) | SR504 (45) IBOA (10) | PPGDA2000 (25) | TPO (3) |
| 3 | PnBa (20) | SR504 (42) IBOA (10) | PPGDA2000 (25) | TPO (3) |
| 4 | PnBa (40) | SR504 (35) | PPGDA2000 (25) | TPO (3) |
| 5 | PnBa (50) | SR504 (25) | PPGDA2000 (25) | TPO (3) |
| 6 | PnBa (60) | SR504 (15) | PPGDA2000 (25) | TPO (3) |
| 7 | PnBa (50) | SR504 (36.4) | PPGDA2000 (25) | TPO (3) |
| 8 | PnBa (21) | SR504 (14) IBOA (22) | PPGDA2000 (25) | TPO (3) |

**Coating composition 2 is a control composition that included NRBU (non-reactive branched urethane). NRBU is not an acrylic polymer and has the formula: C[CH$_2$(PO)$_7$~IPDI~P1200~IPDI~BD~IPDI~P1200~IPDI~O(CH$_2$)$_2$OC$_4$H$_9$]$_4$ where PO is propylene oxide, IPDI is isophorone diisocyanate, BD is 1,4-butanediol, and P1200 is a polypropylene glycol moiety with a number average molecular weight of about 1200.

TABLE 2

Illustrative Coating Compositions

| Ref. No. | Acrylic Polymer | H-Donor Monomer | Monofunctional Acrylate(s) | Multifunctional Acrylate | Photoinitiator |
|---|---|---|---|---|---|
| 9 | PnBa (18) | nBAM (2) | SR504 (45) IBOA (10) | PPGDA2000 (25) | TPO (3) |
| 10 | PnBa (18) | AM (2) | SR504 (45) IBOA (10) | PPGDA2000 (25) | TPO (3) |
| 13 | PnBa (15) | AM (10) | SR504 (45) IBOA (5) | PPGDA2000 (25) | TPO (3) |
| 15 | PnBa (50) | AM (5) | SR504 (45) | None | TPO (3) |
| 17 | PnBa (19) | CEA (1) | SR504 (45) IBOA (10) | PPGDA2000 (25) | TPO (3) |
| 19 | PnBa (15) | CEA (10) | SR504 (45) IBOA (5) | PPGDA2000 (25) | TPO (3) |
| 20 | PnBa (20) | SR495 (4) | SR504 (38) IBOA (10) | PPGDA2000 (25) | TPO (3) |

TABLE 3

Illustrative Coating Compositions

| Ref. No. | Acrylic Polymer | Mono-functional Acrylate(s) | Multi-functional Acrylate | Photoinitiator & Additives |
|---|---|---|---|---|
| 23 | PnBa (20) | SR504 (72) | SR492 (5) | TPO (3) |
| 25 | PnBa (30) | SR504 (50) IBOA (10) | SR492 (7) | TPO (3) |
| 36 | PnBa (30) | SR256 (33) IBOA (27) | SR492 (7) | TPO (3) |
| 39 | PnBa (30) | SR335 (33) IBOA (27) | SR492 (7) | TPO (3) |
| 43 | PnBa (30) | CD9075 (35) IBOA (27) | SR508 (5) | TPO (3) |
| 52 | PnBa (20) | SR504 (58.5) IBOA (13.8) | SR306 (5.2) | TPO (3) APTMS (1) Irg1035 (0.5) |
| 56 | PnBa (30) | SR504 (51.7) IBOA (12.2) | SR508 (3.7) | TPO (3) APTMS (1) Irg1035 (0.5) |
| 57 | PnBa (30) | SR504 (52.1) IBOA (12.3) | SR351 (3.0) | TPO (3) APTMS (1) Irg1035 (0.5) |

TABLE 4

Illustrative Coating Compositions

| Ref. No. | Acrylic Polymer | H-Donor Monomer | Mono-functional Acrylate(s) | Multi-functional Acrylate | Photoinitiator |
|---|---|---|---|---|---|
| 30 | PnBa (30) | SR495 (10) | SR504 (50) | SR492 (7) | TPO (3) |
| 31 | PnBa (21) | SR495 (4) | SR504 (64) | SR492 (8) | TPO (3) |
| 34 | PnBa (21) | SR495 (4) | SR504 (60) | SR492 (12) | TPO (3) |
| 45 | PnBa (30) | SR495 (5) | SR504 (10) CD9075 (23) IBOA (22) | SR306 (7) | TPO (3) Irg1035 (1) |
| 47 | PnBa (30) | SR495 (5) | SR504 (10) CD9075 (25) IBOA (22) | SR351 (5) | TPO (3) Irg1035 (1) |
| 50 | PnBa (30) | SR495 (5) | SR504 (10) CD9075 (23) IBOA (22) | SR351 (7) | TPO (3) Irg1035 (1) |

In the tables, PnBa is poly(butyl acrylate), SR504 is ethoxylated (4) nonyl phenol acrylate (Sartomer USA), IBOA is isobornyl acrylate (Sartomer USA), PPGDA2000 is poly(propylene glycol)diacrylate with $M_n$ around 2000 g/mol (Aldrich); TPO is 2,4,6-trimethylbenzoyldiphenylphosphine oxide (BASF); nBAM is N-n-butylacrylamide (Aldrich); AM is acrylamide (Aldrich); CEA is 2-carboxyethyl acrylate (Aldrich); SR495 is caprolactone acrylate (Sartomer USA); SR492 is propoxylated (3) trimethylolpropane triacrylate (Sartomer USA); SR256 is 2-(2-ethoxyethoxy)ethyl acrylate (Sartomer USA); SR335 is lauryl acrylate (Sartomer USA); CD9075 is tetraethoxylated lauryl acrylate (Sartomer USA); SR508 is dipropylene glycol diacrylate (Sartomer USA); SR306 is tripropylene glycol diacrylate (Sartomer USA); APTMS (an adhesion promoter) is (3-acryloxypropyl)trimethoxysilane (Gelest); Irg1035 (an antioxidant) is thiodiethylene bis(3-(3,5-di-tert-butyl-4-hydroxyphenyl)propionate) (Ciba Specialty Chemicals); and SR351 is trimethylolpropane triacrylate (Sartomer USA).

Coatings in the form of cured films were formed from the compositions given in Tables 1-4. The cured films were prepared with the listed components using commercial blending equipment. Each coating composition was prepared by combining all components except for the TPO photoinitiator and, if present, the Irg1035 anti-oxidant and the APTMS adhesion promoter. The components were weighed into a jacketed beaker and heated to 60° C.-70° C. Blending was continued until a homogeneous mixture was obtained. TPO was then weighed and added to the beaker (along with Irg1035 and APTMS in coating compositions that included these additives). Blending was then continued until a homogeneous mixture was obtained. Films were prepared by drawing down the blended compositions on a glass plate using a 5 mil draw down bar. Films were cured using a Fusion D lamp with a nitrogen purge. The films received a dose of approximately 1350 mJ/cm². All samples were allowed to condition overnight in a controlled environment at 23° C. and 50% relative humidity.

The Young's modulus, tensile strength and % elongation of cured films formed from the coating compositions were measured. Tensile properties were measured using a Sintech MTS tensile tester. Tensile tests followed ASTM882-97. The gauge length used for testing was 5.1 cm and the test speed was 2.5 cm/minute. Tensile strength, % strain at break, and Young's Modulus values were recorded. $T_g$ values of selected films formed from compositions A and B were determined from the tan δ peak in a DMA measurement (1 Hz oscillation frequency and 1° C./min scan rate).

The properties of the cured films are summarized in Tables 5-8 below, respectively, for the coating compositions listed in Tables 1-4. The films are labeled by the reference numerals of the coating compositions from which they were prepared. The reference numerals in Table 5 correspond with those listed in Tables 1-4. The property measurements for the cured films are consistent with properties desired in primary fiber coatings. The results shown in Tables 5 and 7 indicate that suitable primary coatings can be obtained from compositions lacking constituents with hydrogen-donor groups. Contrary to the expectations of the prior art, the results indicate that hydrogen bonding interactions are not essential in primary coatings and compositions.

TABLE 5

Properties of Cured Films

| Ref. No. | Tensile Strength (MPA) | Elongation (%) | Young's Modulus (MPa) | $T_g$ (° C.) |
|---|---|---|---|---|
| 1 | 0.39 ± 0.06 | 55 ± 6 | 0.91 ± 0.07 | −24 |
| 2 | 0.34 ± 0.05 | 71 ± 7 | 0.67 ± 0.03 | −23 |
| 3 | 0.60 ± 0.06 | 71 ± 6 | 0.98 ± 0.07 | −24 |
| 4 | 0.15 ± 0.01 | 79 ± 6 | 0.23 ± 0.02 | −32 |
| 5 | 0.11 ± 0.02 | 87 ± 10 | 0.18 ± 0.02 | −33 |
| 6 | 0.08 ± 0.01 | 101 ± 4 | 0.12 ± 0.02 | −35 |
| 7 | 0.07 ± 0.01 | 103 ± 7 | 0.15 ± 0.03 | −27 |
| 8 | 0.37 ± 0.09 | 57.2 ± 12 | 0.84 ± 0.02 | |

TABLE 6

Properties of Cured Films

| Ref. No. | Tensile Strength (MPA) | Elongation (%) | Young's Modulus (MPa) | $T_g$ (° C.) |
|---|---|---|---|---|
| 9 | 0.40 ± 0.03 | 56 ± 5 | 0.92 ± 0.05 | −21 |
| 10 | 0.39 ± 0.05 | 55 ± 7 | 0.95 ± 0.03 | |
| 13 | 1.43 ± 0.17 | 88 ± 9 | 2.95 ± 0.19 | |
| 15 | 0.08 ± 0.01 | 107 ± 19 | 0.31 ± 0.06 | |
| 17 | 0.35 ± 0.02 | 48 ± 2 | 0.95 ± 0.05 | |

TABLE 6-continued

Properties of Cured Films

| Ref. No. | Tensile Strength (MPA) | Elongation (%) | Young's Modulus (MPa) | $T_g$ (°C.) |
|---|---|---|---|---|
| 19 | 0.44 ± 0.06 | 56 ± 6 | 1.04 ± 0.05 | |
| 20 | 0.30 ± 0.05 | 43 ± 7 | 0.88 ± 0.06 | |

TABLE 7

Properties of Cured Films

| Ref. No. | Tensile Strength (MPA) | Elongation (%) | Young's Modulus (MPa) |
|---|---|---|---|
| 23 | 0.10 ± 0.02 | 23 ± 5 | 0.45 ± 0.01 |
| 25 | 0.28 ± 0.10 | 36 ± 3 | 0.84 ± 0.04 |
| 36 | 0.24 ± 0.07 | 50 ± 8 | 0.66 ± 0.12 |
| 39 | 0.06 ± 0.03 | 30 ± 16 | 0.21 ± 0.04 |
| 43 | 0.08 ± 0.03 | 63 ± 17 | 0.16 ± 0.04 |
| 52 | 0.23 ± 0.09 | 29 ± 11 | 0.93 ± 0.18 |
| 56 | 0.11 ± 0.04 | 37 ± 13 | 0.37 ± 0.08 |
| 57 | 0.14 ± 0.05 | 29 ± 9 | 0.58 ± 0.10 |

TABLE 8

Properties of Cured Films

| Ref. No. | Tensile Strength (MPA) | Elongation (%) | Young's Modulus (MPa) |
|---|---|---|---|
| 30 | 0.12 ± 0.01 | 30 ± 3 | 0.59 ± 0.03 |
| 31 | 0.18 ± 0.05 | 14 ± 5 | 1.00 ± 0.07 |
| 34 | 0.17 ± 0.14 | 10 ± 7 | 1.87 ± 0.13 |
| 45 | 0.06 ± 0.02 | 27 ± 8 | 0.27 ± 0.02 |
| 47 | 0.19 ± 0.04 | 29 ± 4 | 0.80 ± 0.13 |
| 50 | 0.34 ± 0.12 | 23 ± 6 | 1.87 ± 0.42 |

Coating composition 3 was applied as a primary coating to a glass fiber (core with concentric cladding having an outer diameter of 125 μm) in a draw process operating at a speed of >20 m/s. An acrylate-based secondary coating was also applied to the fiber. Coating composition 3 was shown to have a viscosity compatible with standard drawing processes and a coated fiber was successfully prepared using UV curing. The thickness of the cured primary coating formed from composition 3 in this experiment was ~30 μm. The in situ $T_g$ of coating composition 3 as primary coating on the fiber was determined to be −51° C. Wire drum and basketweave microbending tests indicated that the fiber exhibited low microbending induced attenuation at 1550 nm and temperatures as low as at least −60° C. The microbend performance was superior to a reference fiber that included a primary coating with constituents having hydrogen-donor groups.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber coating composition comprising: a radiation-curable component; a photoinitiator; and an acrylic polymer, said acrylic polymer lacking radiation-curable groups, hydrogen-donor groups, urethane groups, and urea groups, further comprising a linear or branched urethane oligomer of the type shown in formula (1a) or (1b) below:

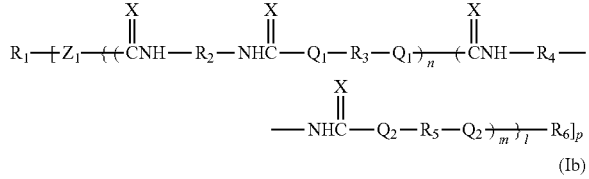

(Ia)

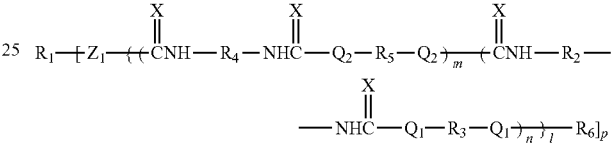

(Ib)

wherein,
   $R_1$ is a core moiety of a multifunctional reactant, where the number of functional groups of the core moiety is define by p, wherein p is 2 or greater;
   each X is independently S or O;
   $Z_1$ is —O—, —S—, —N(H)—, or —N(alkyl)-;
   each $Q_1$ and $Q_2$ is independently —O—, —S—, —N(H)—, or —N(alkyl)-;
   each of $R_2$ and $R_4$ is a core moiety of a di(thio)isocyanate reactant;
   $R_3$ is a core moiety of a polyol or amine-capped polyol reactant;
   $R_5$ is a hydrocarbon or oxygen containing hydrocarbon having an average molecular weight of between about 28 to about 400;
   $R_6$ is represented by the structure according to formula (II) or (III)

(II)

(III)

where X is define as above, $Z_2$ is —O—, —S—, —N(H)—, or —N(alkyl)-, $R_7$ is a core moiety of a di(thio)isocyanate reactant, $R_8$ is a non-radiation curable capping agent, and $R_9$ is a core moiety of an isocyanate of thioisocyanate reactant; / is 1 to 6; m is greater than or equal to 0; and n is greater than or equal to 1.

2. The coating composition of claim 1, wherein said radiation-curable component includes a monofunctional (meth)acrylate monomer.

3. The coating composition of claim 2, wherein said radiation-curable component further includes a multifunctional (meth)acrylate compound.

4. The coating composition of claim 3, wherein said monofunctional (meth)acrylate monomer has a number average molecular weight less than 3000 g/mol and said multifunctional (meth)acrylate compound has a number average molecular weight less than 3000 g/mol.

5. The coating composition of claim 3, wherein said multifunctional (meth)acrylate compound is a multifunctional polyol acrylate.

6. The coating composition of claim 3, wherein said radiation-curable component further includes a second radiation-curable monomer.

7. The coating composition of claim 1, wherein said acrylic polymer includes repeat units derived from one or more acrylic monomers.

8. The coating composition of claim 7, wherein said acrylic polymer is a homopolymer of a single acrylic monomer.

9. The coating composition of claim 8, wherein said single acrylic monomer is an alkyl (meth)acrylate or an oxygenated alkyl (meth)acrylate.

10. The coating composition of claim 7, wherein said one or more acrylic monomers lack hydrogen-donor groups, urea groups, and urethane groups.

11. The coating composition of claim 1, wherein said acrylic polymer has a glass transition temperature less than $-20°$ C.

12. The coating composition of claim 1, wherein said acrylic polymer has a number average molecular weight between 10,000 g/mol and 80,000 g/mol.

13. The coating composition of claim 1, wherein said acrylic polymer is present in said composition in an amount from 5-50 wt %.

14. The coating composition of claim 1, wherein said composition lacks urethane groups, urea groups, and hydrogen-donor groups.

15. The coating composition of claim 1, further comprising a monomer, said monomer including a hydrogen-donor group.

16. The coating composition of claim 1, further comprising a second acrylic polymer.

* * * * *